Aug. 10, 1965 D. F. BUSCH 3,200,382

REGENERATIVE SWITCHING CIRCUIT

Filed Aug. 28, 1961

INVENTOR
DONALD F. BUSCH

BY *[signature]*
AGENT

United States Patent Office 3,200,382
Patented Aug. 10, 1965

3,200,382

REGENERATIVE SWITCHING CIRCUIT

Donald F. Busch, Vestal, N.Y., assignor to International Business Machines Corporation, New York, N.Y., a corporation of New York Filed Aug. 28, 1961, Ser. No. 134,532
5 Claims. (Cl. 340—174)

This invention relates to electrical switching circuits and more particularly to a regenerative magnetic switching circuit applicable to data processing systems.

Heretofore, gating circuits have employed diodes and tubes as the principal components, but these elements are likely to fail and it is desirable to reduce the number of elements required as far as possible. It is well known that many present-day data processing and data handling systems employ vacuum tubes. It is also known that computer engineers are perfecting data processing and data handling systems employing magnetic or solid state components. The present invention will have application to such data processing and data handling systems.

Accordingly, it is a principal object of the present invention to provide a novel regnerative switching circuit.

It is another object of the present invention to provide a novel circuit whereby a delay means triggers a switching means for simultaneously gating a pulse to a load device and regenerate the switching device.

It is still another object of the present invention to provide an improved single core switching device having negligible power losses.

It is still another object of the present invention to provide a new and improved pulse controlled switching device of the magnetic type.

A further object of the invention is to provide a magnetic switching device which furnishes a gating pulse in response to an input pulse after a predetermined delay has occurred.

It is still another object of the present invention to provide a novel and inexpensive magnetic switching device.

The magnetic switching of the present invention comprises a magnetic core having three windings inductively coupled thereto. A drive pulse applied to an input winding will cause the core to switch its state of magnetic saturation. The switching of the core induces a potential in an output winding which serves to charge a capacitor that is coupled with a normally nonconductive transistor that controls a load circuit. After the switching of the core, the discharge of the potential stored in the capacitor will render the transistor conductive. The transistor in series circuit configuration with a reset winding on the core and the load will cause current flow in the load circuit serving to simultaneously pulse the load and reset the magnetic core to its original state of magnetic saturation. When the core has completely switched, the transistor will restore to its nonconductive state and the magnetic switching circuit is ready to receive the next drive pulse.

The foregoing and other objects, features and advantages of the invention will be apparent from the following more particular description of a preferred embodiment of the invention, as illustrated in the accompanying drawings.

Figure 2:
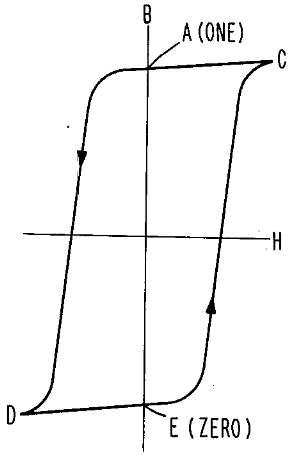
FIG. 2 is a graphical representation of the magnetization characteristics of the magnetic core utilized in connection with this invention.

The curve in FIG. 2 illustrates an idealized hysteresis loop of commercially obtainable magnetic material. Points A and E are stable remanent states further adapted for representing binary information, and a core may be driven to either of these states by the application of a positive or negative magnetomotive force respectively. If the state of remanence of a core of such material is that indicated by the point A, application of a positive magnetomotive force greater than the coercive force causes it to traverse the hysteresis curve to point C and, upon relaxation of this positive force, revert to point A. Application of a negative magnetomotive force greater than the coercive force causes the curve to be traversed to point D, and when the force is terminated, traversed to point E. Similarly, when the remanent state of the core stands at point E, the application of a negative magnetomotive force causes the curve to be traversed to point D and returned to point E when the negative force is relaxed; while a positive force greater than the coercive force causes the traversal of the curve from point E to point C and return to point A when the positive force is terminated. The state of remanence indicated at point A on the curve has been arbitrarily selected as reprsenting a "1" and the state of remanence indicated at point E as a "0." In order to indicate how the turns of a winding are placed on a core, the dot convention is employed to indicate that current flowing out of a winding from a dot-marked end is arbitrarily assumed to produce a counterclockwise flux in the core. Stated otherwise, the core is switched in a positive direction. Current flowing into a winding at a dot-marked end then produces a clockwise flux in the core. Stated otherwise, the core is switched in a negative direction.

Figure 1:
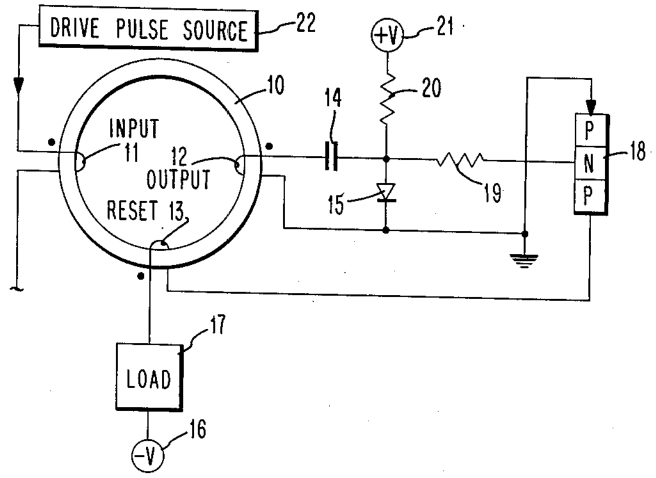
FIG. 1 is a schematic diagram of a circuit embodying the invention employed in a novel regenerative switching circuit.

Reference is made to FIG. 1 for a description of the regenerative switching circuit constructed according to the principles of the present invention. As shown, the regenerative switching circuit includes the magnetic core 10 with an input winding 11, an output winding 12, and a reset winding 13 all inductively coupled thereto. The output winding 12 is connected with an energy storing circuit including the capacitor 14 and diode 15. The load circuit includes a load potential 16, a load 17, the reset winding 13, and a transistor 18 in serial circuit configuration. The base of transistor 18 is connected through the current limiting resistor 19 with the energy storing circuit comprising capacitor 14 and diode 15, and through resistor 20 with the biasing potential 21. Normally the transistor 18 is biased to a nonconductive condition.

When a drive pulse is applied to the input winding 11, the magnetic core 10 will switch from its remanent state to the opposite state. The core 10 in switching induces a voltage in output winding 12. This induced voltage will cause a current flow in the forward direction through capacitor 14 and diode 15 serving to charge capacitor 14. This current flow will reinforce the transistor 18 cutoff bias.

At the end of the drive pulse or when the core has switched its state, the voltage in output winding 12 will return to 0. The voltage stored on capacitor 14 is in such a direction as to render transistor 18 conductive. The capacitor 14 reverse biases the diode 15 and draws current from the bias potential source 21, and sufficient transistor base current to turn the transistor 18 "on."

When the transistor 18 is conductive current will flow in the load circuit thereby delivering current to the load 17. The current flow in reset winding 13 is in such a direction as to cause the core 10 to switch back to its original remanent state. The core 10 in switching to its original remanent state will induce a voltage in output winding 12 which serves to add with the capacitor 14 in drawing transistor base current.

When the magnetic core 10 reaches the original remanent state of saturation, the voltage in output winding 12 will return to 0. Sufficient charge will have been removed from the capacitor 14 to permit the bias voltage of potential source 21 to turn transistor 18 "off."

Thus the regenerative switching circuit has been restored to its original condition and is in readiness to receive the next drive pulse.

The arrangement is shown with the load in series with the core and transistor. The load could be driven in parallel with the core or placed on an additional core winding. The preferred arrangement as shown permits isolation of the load during the time the transistor is "off." The load can be core logic which can also be driven or reset by other circuits when properly isolated.

With the advent of the present invention there is provision of a gating circuit wherein the pulse width is controlled by the switching time of the magnetic core. Furthermore, the circuit automatically restores itself at the end of a cycle and is in readiness to be triggered again.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic switching circuit comprising a transistor; a magnetic core capable of assuming either of two stable states of magnetic remanence, one of which is a reference state, and having an input, an output, and reset windings inductively coupled thereto; an energy storing means connected across said output winding; a bias potential; means electrically connecting said transistor and said bias potential with said energy storing means; a load potential; a load circuit including said transistor, said reset winding, a load and connected with said load potential; and means for applying pulses to said input winding for switching said core from its reference state and thereby supply current to said energy storing means and at the termination of each applied pulse the energy stored in said energy storing means being sufficient to render said transistor conductive with the resulting current flow in the load circuit serving to simultaneously pulse said load and restore said core to its reference state.

2. A magnetic switching circuit comprising a transistor; a magnetic core capable of assuming either of two stable states of magnetic remanence, one of which is a reference state, and having an input, an output, and reset windings inductively coupled thereto; an energy storing means including a capacitor and diode connected across said output winding; a bias source; means electrically connecting said transistor and said bias source with said energy storing means; a load circuit including said transistor, said reset winding, a load and connected with a load potential; and means for applying pulses to said input winding for switching said core from its reference state and supply current to said energy storing means and to charge said capacitor and at the termination of each applied pulse the energy stored in said capacitor being sufficient to render said transistor conductive with the resulting current flow in the load circuit serving to simultaneously pulse said load and restore said core to its reference state.

3. A magnetic switching circuit comprising a transistor having a base, an emitter, and a collector; a magnetic core capable of assuming either of two stable states of magnetic remanence, one of which is a reference state, and having an input, an output, and reset windings inductively coupled thereto; an energy storing circuit means including a serially coupled capacitor and diode connected across said output winding; a bias potential; resistive elements electrically connecting the base of said transistor and said bias potential with the serial coupling for said capacitor and said diode; a load potential; a load circuit including said transistor, said reset winding, a load and connected with said load potential; and means for applying pulses to said input winding for switching said core from its reference state and thereby supply current to said energy storing circuit means and to charge said capacitor, and at the termination of each applied pulse the energy stored in said capacitor being sufficient to render said transistor conductive with the resulting current flow in the load circuit serving to simultaneously pulse said load and restore said core to its reference state.

4. A gating circuit comprising a bistable magnetic core having an input winding, an output winding and reset winding inductively coupled thereto; a transistor; a load circuit including said transistor, said reset winding, a load and connected with a load potential; means for normally biasing said transistor below cutoff; means for applying a drive pulse to said input winding; and means for storing the output signals of said core as a potential in a delay circuit connected across said output winding, whereby when said drive pulse terminates said stored potential causes said transistor to become conductive and apply switching current to the reset winding on said core and to said load.

5. A gating circuit comprising a bistable magnetic core having an input winding, an output winding and reset winding inductively coupled thereto; a transistor having a base, an emitter, and a collector; a load circuit including said transistor, said reset winding, a load and connected with a load potential; means for normally biasing said transistor below cutoff; means for applying a drive pulse to said input winding; and means for storing the output signal of said core as a potential in a delay circuit having a serially coupled capacitor and diode connected across said output winding, whereby when said drive pulse terminates said stored potential causes said transistor to become conductive and apply switching current to the reset winding on said core and to said load.

References Cited by the Examiner

UNITED STATES PATENTS

| | | | |
|---|---|---|---|
| 2,902,609 | 9/59 | Ostroff et al. | 340—174 |
| 3,053,992 | 9/62 | Todman | 340—174 |
| 3,063,038 | 11/62 | Davis et al. | 340—174 |

IRVING L. SRAGOW, *Primary Examiner.*